United States Patent
Yamauchi et al.

(10) Patent No.: US 6,710,130 B2
(45) Date of Patent: Mar. 23, 2004

(54) PROPYLENE POLYMER COMPOSITION AND ITS FOAM MOLDINGS

(75) Inventors: Akira Yamauchi, Chiba (JP); Yoshitaka Kobayashi, Chiba (JP); Tadamitu Hamasaki, Chiba (JP); Shunji Kawazoe, Chiba (JP); Jun Shinozaki, Chiba (JP); Hiroyuki Maehara, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

(21) Appl. No.: 10/108,423

(22) Filed: Mar. 29, 2002

(65) Prior Publication Data

US 2002/0183454 A1 Dec. 5, 2002

(30) Foreign Application Priority Data

Mar. 30, 2001 (JP) ........................ 2001-101795

(51) Int. Cl.⁷ ............... C08J 9/16; C08J 9/18; C08L 9/36; C08L 23/00; C08L 23/04
(52) U.S. Cl. ............... 525/191; 525/197; 525/208; 525/240; 525/241; 521/53; 521/56; 521/59; 521/60; 521/62; 521/134; 521/139
(58) Field of Search ............... 525/191, 197, 525/208, 240, 241; 521/53, 56, 59, 60, 62, 134, 139

(56) References Cited

U.S. PATENT DOCUMENTS

| | | | |
|---|---|---|---|
| 3,808,206 A | 4/1974 | Fleming et al. | |
| 4,368,304 A | 1/1983 | Sato et al. | |
| 4,460,757 A | 7/1984 | Sato et al. | |
| 4,952,649 A | 8/1990 | Kioka et al. | |
| 5,539,067 A | 7/1996 | Parodi et al. | |
| 5,618,771 A | 4/1997 | Parodi et al. | |
| 6,153,710 A | * 11/2000 | Saito et al. | 526/75 |
| 6,194,342 B1 | 2/2001 | Parodi et al. | |
| 6,235,845 B1 | * 5/2001 | Yamauchi et al. | 525/191 |
| 6,303,696 B1 | * 10/2001 | Ushioda et al. | 525/240 |

FOREIGN PATENT DOCUMENTS

| | | |
|---|---|---|
| EP | 0 028 076 | 5/1981 |
| EP | 0 384 431 | 8/1990 |
| EP | 0 534 119 | 3/1993 |
| EP | 0 700 943 | 3/1996 |
| EP | 0 856 526 | 8/1998 |
| EP | 0 864 589 | 9/1998 |
| JP | 56-3356 | 1/1981 |
| JP | 57-34112 | 2/1982 |
| JP | 57-63310 | 4/1982 |
| JP | 67-63311 | 4/1982 |
| JP | 58-83006 | 5/1983 |
| JP | 58-138712 | 8/1983 |
| JP | 59-93711 | 5/1984 |
| JP | 59-28573 | 7/1984 |
| JP | 61-28694 | 7/1986 |
| JP | 61-152754 | 7/1986 |
| JP | 62-104810 | 5/1987 |
| JP | 62-104811 | 5/1987 |
| JP | 62-104812 | 5/1987 |
| JP | 63-37111 | 2/1988 |
| JP | 63-66323 | 12/1988 |
| JP | 2-298536 | 12/1990 |
| JP | 4-55410 | 2/1992 |
| JP | 5-222122 | 8/1993 |
| JP | 9-169826 | 6/1997 |
| WO | 91/13933 | 9/1991 |
| WO | 97/14725 | 4/1997 |

* cited by examiner

Primary Examiner—Nathan M. Nutter
(74) Attorney, Agent, or Firm—Wenderoth, Lind & Ponack, L.L.P.

(57) ABSTRACT

A propylene polymer composition of high melt tension, which is especially favorable for foam moldings of uniform thickness, and foam moldings thereof having a uniform thickness, are obtained by melt-kneading a polymer mixture of a specific ethylene polymer (A) and a specific olefin multi-stage polymer (B) to satisfy the following formula:

$$\mathrm{Log}(MS) > 0.91 - 0.23 \times \mathrm{Log}(MFR(T))$$

18 Claims, No Drawings

PROPYLENE POLYMER COMPOSITION AND ITS FOAM MOLDINGS

BACKGROUND OF THE INVENTION (1) Technical Field

The present invention relates to a propylene polymer composition and foam moldings thereof. More precisely, the invention relates to a propylene polymer composition of high melt tension especially suitable to foam molding, and relates to foam moldings of the polymer composition of uniform thickness.

(2) Related Art

Because of its good mechanical properties and chemical resistance and the fact it is economical to use, polypropylene is widely used in the art of various molding. However, as its melt tension is low, the moldability of polypropylene in, for example, blow molding, foam molding and extrusion molding is in fact not good.

For increasing the melt tension of polypropylene, for example, a method of reacting polypropylene in melt with an organic peroxide and a crosslinking promoter (JP-A-59-93711, 61-152754); and a method of reacting semi-crystalline polypropylene with a peroxide having a low decomposition point in the absence of oxygen to produce gel-free propylene having long free end branches (JP-A-2-298536)are known.

These methods are effective for increasing the melt tension of polypropylene, but are problematic in that the products often have an offensive smell as they require an organic peroxide and a crosslinking promoter. In addition, when the products are recycled, their thermal stability is lowered as the melt flow rate of polypropylene increases in the recycling step. Moreover, the methods are not fully satisfactory from a productivity standpoint.

Another method for increasing the melt viscoelasticity such as melt tension of polypropylene has been proposed, which comprises producing a composition containing polypropylene, and polyethylene or polypropylene that differs from the polypropylene in the intrinsic viscosity or the molecular weight by blending them or by polymerizing monomers in multi-stage polymerization. For example, from 2 to 30 parts by weight of ultra-high-molecular polypropylene is added to 100 parts by weight of ordinary polypropylene, and the resulting mixture is extruded at a temperature falling between the melting point of the mixture and 210° C. (JP-B-61-28694). However, the melt tension of these compositions is still not fully satisfactory. The multi-stage polymerization to produce such an ultra-high-molecular polyolefin requires extremely low-temperature reaction, for which, therefore, the ordinary process must be specifically modified and, in fact, its productivity is inevitably lowered.

Apart from the methods mentioned above, also known are a method of producing polypropylene of high melt tension by polymerizing propylene in the presence of a prepolymerized catalyst prepared by prepolymerizing ethylene and a polyene compound with a supported-type titanium-containing solid catalyst component and an organoaluminium compound catalyst component (JP-A-5-222122); and a method of producing an ethylene-α-olefin copolymer of high melt tension in the presence of a polyethylene-containing prepolymerized catalyst in which the polyethylene has an intrinsic viscosity of at least 20 dl/g and which is prepared through prepolymerization of ethylene alone with the catalyst components as above (JP-A-4-55410). In these methods, however, an additional third component, i.e. polyene compound must be prepared, and the prepolymerized polyethylene could not uniformly disperse in the final product, i.e. the polyolefin composition. Therefore, the methods are problematic in that the quality of the polyolefin composition is unstable. In addition, also known are an olefin (co)polymer composition of high melt tension which is obtained by polymerizing propylene in the presence of a polyethylene-containing prepolymerized catalyst in which the polyethylene has an intrinsic viscosity of at least 15 dl/g; and a method for producing it (WO97/14725)

However, when conventional compositions are kneaded in melt at temperatures not higher than 250° C., their melt could exhibit high melt tension, but the thickness of their foam moldings is apt to be non-uniform and the appearance thereof is apt to be worse. Therefore, when the foam moldings are thermoformed (fabricated), they have a tendency to be readily broken at the thin part. On the other hand, when the compositions are kneaded in melt at a temperature higher than 250° C., the thickness of their foam moldings may be uniform, but their melt tension is apt to be low. Therefore, the foam moldings have a tendency to be difficult to thermoform (fabricate), as their drawdown is great.

SUMMARY OF THE INVENTION

The present invention has been made in consideration of the situation of the prior art mentioned above. One object of the invention is to provide a propylene polymer composition of high melt tension which, even in the case that any special additive isn't used, can be foamed into good foams of uniform thickness that can be well thermoformed (fabricated) with no drawdown trouble.

We, the present inventors have assiduously studied to solve the problems noted above, and, as a result, have found that a propylene polymer composition, prepared by melt-kneading a polymer mixture comprising a specific ethylene polymer and a specific olefin multi-stage polymer, and having specific melt properties, attains the intended object. The invention includes the following 1) to 8).

1) A propylene polymer composition obtain by melt-kneading a polymer mixture comprising an olefin multi-stage polymer (B) mentioned below and an ethylene polymer (A) mentioned below in an amount from 0.01 to 5.0 parts by weight relative to 100 parts by weight of the polymer (B), and satisfying the following formula (1) in point of a melt tension (MS, unit:cN) at 190° C. and melt flow rate (MFR(T), unit:dg/min) of the composition:

$$\mathrm{Log}(MS) > 0.91 - 0.23 \times \mathrm{Log}(MFR(T)) \tag{1},$$

[1] ethylene polymer (A), having an intrinsic viscosity of from 15 to 100 dl/g measured in tetralin at 135° C.,

[2] olefin multi-stage polymer (B), obtained by producing a propylene polymer (I) in a polymerization step (I) to a range of from 30 to 95% by weight of the olefin multi-stage polymer, followed by producing an olefin polymer (II) in a subsequent polymerization step (II) to a range of from 5 to 70% by weight of the olefin multi-stage polymer.

2) The propylene polymer composition of 1) above, for which the polymer mixture is melt-kneaded at a temperature thereof falling between 280 and 500° C.

3) The propylene polymer composition of 1) above, for which the polymer mixture is prepared by producing the olefin multi-stage polymer (B) in the presence of a pre-activated catalyst prepared by supporting the ethylene polymer (A) on an olefin polymerization catalyst.
4) The propylene polymer composition of 3) above, for which a melt flow rate (MFR(i), unit:dg/min) of the polymer after the polymerization step (I) and a melt flow rate (MFR(ii), unit:dg/min) of the olefin polymer (II) satisfy the following formula (2) and (3):

$$3 \leq Log(MFR(i)/MFR(ii)) \leq 7 \quad (2)$$

$$MFR(ii) < 1 \times 10^{-3} \text{ dg/min} \quad (3).$$

5) The propylene polymer composition of any one of 1) to 4) above, for which the propylene polymer (I) is a propylene homopolymer, or a propylene-olefin copolymer of propylene and an olefin with from 2 to 12 carbon atoms except propylene, having at least 50% by weight, based on the copolymer, of propylene units.
6) The propylene polymer composition of any one of 1) to 5) above, for which the olefin polymer (II) is a homopolymer or copolymer of an olefin with from 2 to 12 carbon atoms.
7) A foam molding of the propylene polymer composition of any one of 1 to 6) above.
8) The foam molding of 7) above, of which the fluctuation in the thickness falls within a range of ±5% of the mean thickness of the foam molding.

PREFERRED EMBODIMENTS

The propylene polymer composition of the invention is obtained by melt-kneading a polymer mixture of a specific olefin multi-stage polymer (B) and from 0.01 to 5.0 parts by weight, relative to 100 parts by weight of the polymer (B), of a specific ethylene polymer (A), and has specific melt properties.

If the amount of the ethylene polymer (A) in the mixture is smaller than 0.01 parts by weight relative to 100 parts by weight of the olefin multi-stage polymer (B) therein, the melt tension of the resulting propylene polymer composition will not increase; but if larger than 5.0 parts by weight, the melt tension increase will not further increase and, in addition, the ethylene polymer (A) and the olefin multi-stage polymer (B) will not uniformly disperse in the mixture. Preferably, the propylene polymer composition of the invention contains from 0.02 to 3.0 parts by weight, relative to 100 parts by weight of the olefin multi-stage polymer (B), of the ethylene polymer (A).

The ethylene polymer (A) has an intrinsic viscosity of from 15 to 100 dl/g, measured in tetralin at 135° C. If the intrinsic viscosity of the ethylene polymer (A) is lower than 15 dl/g, the melt tension of the propylene polymer composition obtained by melt-kneading the polymer mixture will not increase. The uppermost limit of the intrinsic viscosity of the ethylene polymer (A) is not specifically defined. However, if the intrinsic viscosity difference between the two is too large, the ethylene polymer (A) and the olefin multi-stage polymer (B) will not uniformly disperse in the resulting mixture; and if so, the propylene polymer composition will not stably exhibit high melt tension. In consideration of the fact that ethylene polymer having a higher intrinsic viscosity requires a lower polymerization temperature, it is desirable that the uppermost limit of the intrinsic viscosity of the ethylene polymer (A) is up to around 100 dl/g from a productivity standpoint. Preferably, the intrinsic viscosity of the ethylene polymer (A) falls between 17 and 80 dl/g, more preferably between 17 and 50 dl/g.

The intrinsic viscosity of the ethylene polymer (A) must not be lower than 15 dl/g. Therefore, for efficiently increasing its molecular weight, the ethylene polymer (A) is preferably an ethylene homopolymer, or an ethylene-olefin copolymer of ethylene and an olefin with from 3 to 12 carbon atoms having at least 50% by weight, based on the copolymer, of ethylene units. More preferably, it is an ethylene homopolymer, or an ethylene-olefin copolymer of ethylene and an olefin with from 3 to 12 carbon atoms having at least 70% by weight, based on the copolymer, of ethylene units. Even more preferably, it is an ethylene homopolymer, or an ethylene-olefin copolymer of ethylene and an olefin with from 3 to 12 carbon atoms having at least 90% by weight, based on the copolymer, of ethylene units.

When the ethylene polymer (A) is an ethylene-olefin copolymer, the olefin with from 3 to 12 carbon atoms to be copolymerized with ethylene includes, for example, propylene, 1-butene, 1-pentene, 1-hexene, 1-octene, 1-decene, 4-methyl-1-pentene, 3-methyl-1-pentene. Two or more such olefins may be combined for use herein.

One and the same type or two or more different types of such ethylene polymer (A) maybe mixed with the olefin multi-stage polymer (B).

The olefin multi-stage polymer (B) which is a component of the polymer mixture for use in the invention is prepared by producing a propylene polymer (I) in a polymerization step (I) to a range of from 30 to 95% by weight of the olefin multi-stage polymer, followed by producing an olefin polymer (II) in a subsequent polymerization step (II) to a range of from 5 to 70% by weight of the olefin multi-stage polymer. The melt flow rate of the olefin multi-stage polymer (B) preferably falls between 0.1 and 100 dg/min, more preferably between 0.1 and 80 dg/min.

The propylene polymer composition of the invention is favorably obtained by melt-kneading the propylene polymer mixture at a specific temperature. The "polymer mixture" defined herein is one prepared by mixing the olefin multi-stage polymer (B) and the ethylene polymer (A), and this is not specifically defined as to whether the two are in the resulting mixture to some degree of freedom from each other or they are apparently bonded to each other in the mixture. The operation of "melt-kneading" in the invention is meant to indicate that the polymer mixture is kneaded in melt under heat by the use of an extrusion granulator or the like.

The propylene polymer composition of the invention is favorably obtained by melt-kneading the polymer mixture defined herein at a temperature of the mixture falling between 280 and 500° C., more preferably between 280 and 450° C. If the temperature at which the polymer mixture is melt-kneaded is lower than 280° C., the fluctuation in the thickness of the foam molding of the polymer composition will not fall within a range of ±5% of the mean thickness of the foam molding. If so, the appearance of the foam molding is not good, and, in addition, when the foam molding is thermoformed (fabricated), the thin part of it will be broken.

The propylene polymer composition of the invention satisfies the following formula (1) in terms of its MFR(T) and MS.

$$Log(MS) > 0.91 - 0.23 \times Log(MFR(T)) \quad (1).$$

MFR(T) preferably falls between 0.1 and 100 dg/min. If MFR(T) is larger than 100 dg/min, the melt tension of the resulting propylene polymer composition will not increase, and if so, the foam molding of the polymer composition is apt to draw down when thermoformed (fabricated). More preferably, MFR(T) falls between 0.1 and 80 dg/min.

The uppermost limit of MS of the propylene polymer composition of the invention is not specifically defined. However, if its MS is too high, the moldability of the composition will worsen. Even more preferably, the propylene polymer composition of the invention satisfies the following formula (4):

$$1.2-0.23 \times \mathrm{Log}(MFR(T)) > \mathrm{Log}(MS) > 0.91-0.23 \times \mathrm{Log}(MFR(T)) \quad (4).$$

Still more preferably, it satisfies the following formula (5):

$$1.15-0.23 \times \mathrm{Log}(MFR(T)) > \mathrm{Log}(MS) > 0.91-0.23 \times \mathrm{Log}(MFR(T)) \quad (5).$$

Most preferably, it satisfies the following formula (6):

$$1.15-0.23 \times \mathrm{Log}(MFR(T)) > \mathrm{Log}(MS) > 0.96-0.23 \times \mathrm{Log}(MFR(T)) \quad (6).$$

The melt tension (MS) of the propylene polymer composition referred to herein is measured as follows, using Melt Tension Tester Model 2 (by Toyo Seiki Seisakusho). A sample of the propylene polymer composition is heated at 190° C. in a device, and its melt is extruded out into air at 23° C. through a nozzle of 2.095 mm in diameter at a rate of 20 mm/min to form a strand. While the strand is taken up at a rate of 3.14 m/min, its tension is measured. This indicates the melt tension (unit, cN) of the strand, i.e. the propylene polymer composition.

The propylene polymer composition of the invention is favorably produced by mixing the ethylene polymer (A) and the olefin multi-stage polymer (B) in a predetermined ratio in any desired manner into a polymer mixture followed by melt-kneading it at a predetermined temperature.

More preferably, in the presence of a pre-activated catalyst prepared by supporting the ethylene polymer (A) on an olefin polymerization catalyst, a propylene polymer (i) is produced in a polymerization step (I) and then an olefin polymer (ii) is produced in a subsequent polymerization step (II) to prepare a polymer mixture that contains [1] the ethylene polymer (A) and [2] the olefin multi-stage polymer (B) composed of the propylene polymer (i) and the olefin polymer (ii), and the polymer mixture is melt-kneaded into the desired propylene polymer composition.

For the olefin polymerization catalyst to be used in the method of producing the propylene polymer composition, any and every known catalyst component consisting essentially of a transition metal compound catalyst component that contains a titanium compound heretofore proposed for polyolefin production can be used. Especially preferred is a titanium-containing solid catalyst component (c) suitable for industrial production.

For the component (c), for example, there have been proposed a titanium-containing solid catalyst, component consisting essentially of a titanium trichloride composition (JP-B-56-3356, -59-28573, -63-66323), and a titanium-containing, supported catalyst component in which titanium tetrachloride is supported on a magnesium compound and which comprises, as the essential ingredients, titanium, magnesium, halogen and electron donor (JP-A-62-104810, -62-104811, -62-104812, -57-63310, -57-63311, -58-83006, -58-138712). Any of these is employable herein.

The titanium-containing solid catalyst component (c) may be further combined with an organometal compound (a) for the olefin polymerization catalyst for use herein. The organo metal compound (a) is, for example, a compound having an organic group of a metal selected from those of Groups 1, 2, 12 and 13 of the Periodic Table (1991), and includes, for example, organo lithium compounds, organosodium compounds, organomagnesium compounds, organozinc compounds and organoaluminium compounds. Especially preferred are organoaluminium compounds of the following general formula:

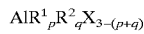

wherein $R^1$ and $R^2$ each independently represent a hydrocarbon group such as an alkyl, cycloalkyl or aryl group, or an alkoxy group; X represents a halogen atom; and p and q each are a positive integer satisfying the condition of $0 < p+q \leq 3$.

The organoaluminium compounds preferred for the organometal compound (a) are, for example, trialkylaluminiums, dialkylaluminium monohalides, dialkylaluminium hydrides, alkylaluminium sesquihalides and monoalkylaluminium dihalides proposed in WO97/14725, and alkoxyalkylaluminiums. Preferred for use herein are trialkylaluminiums and dialkylaluminium monohalides. One or more of these organoaluminium compounds may be used herein either singly or as combined.

If desired, the combination of the titanium-containing solid catalyst component (c) and the organometal compound (a) may be further combined with an electron donor (e) for controlling the olefin polymer production speed and/or the polymer stereospecificity, and this may be used for the catalyst for olefin polymerization.

The electron donor (e) includes, for example, an organic compound having any of oxygen, nitrogen, sulfur and phosphorus atoms in the molecule and an organosilicon compound having Si—O—C bond in the molecule, such as ethers, alcohols, esters, aldehydes, fatty acids, ketones, nitrites, amines, amides, urea and thioureas, isocyanates, azo compounds, phosphines, phosphites, phosphinates, hydrogen sulfide and thioethers, neoalcohols and silanols proposed in WO97/14725.

One or more of these electron donors may be used herein either singly or as combined.

Before being pre-activated by supporting the ethylene polymer (A) thereon, propylene is preferably prepolymerized with the olefin polymerization catalyst to support the resultant propylene polymer thereon. A preferred method for this comprises prepolymerizing propylene with an olefin polymerization catalyst (which comprises a titanium-containing catalyst component (c) and contains from 0.01 to 100 mols, preferably from 0.1 to 50 mols, relative to one mol of titanium in the titanium-containing catalyst component (c), of an organometal compound (a), and from 0 to 50 mols, preferably from 0 to 20 mols, relative to one mol of titanium therein, of an electron donor (e)) so that the catalyst may support propylene polymer having an intrinsic viscosity smaller than 15 dl/g, followed by supporting thereon from 0.01 to 5000 g, per gram of the titanium-containing solid catalyst component (c), of the ethylene polymer (A) having an intrinsic viscosity of from 15 to 100 dl/g to thereby pre-activate the catalyst.

Apart from this, the olefin polymerization catalyst may be first pre-activated by supporting the ethylene polymer (A) thereon, and then prepolymerized with propylene so that it can further support propylene polymer.

In the prepolymerization step and the pre-activation step, if the amount of the organometal compound (a) used is too small, the polymerization speed will be low; but if too large, the polymerization speed will not be accelerated anymore, and much of the residue of the organometal compound (a) will remain in the final product, i.e. the propylene polymer composition. If the amount of the electron donor (e) used is too large, the polymerization speed will be low.

The prepolymerization and pre-activation maybe effected in a liquid phase of an inert solvent or an olefin serving as a solvent, or may also be effected in a vapor phase not requiring a solvent. The inert solvent includes, for example, aliphatic hydrocarbons such as butane, pentane, hexane, heptane, octane, isooctane, decane, dodecane; alicyclic hydrocarbons such as cyclopentane, cyclohexane, methylcyclohexane; aromatic hydrocarbons such as toluene, xylene, ethylbenzene; and gasoline fractions and hydrogenated diesel oil fractions. If the solvent used is too much, it requires a large-scale reactor and the polymerization speed is difficult to efficiently control and maintain.

The pre-activation is not specifically defined so far as it produces from 0.01 to 5000 g, preferably from 0.05 to 2000 g, more preferably from 0.1 to 1000 g, per gram of the titanium-containing solid catalyst component (c), of the ethylene polymer (A). In general, however, it is effected at a relatively low temperature falling between −40 and 40° C., preferably between −40 and 30° C., more preferably between −40 and 20° C. or so, under a pressure falling between 0.1 and 5 MPa, preferably between 0.2 and 5 MPa, more preferably between 0.3 and 5 MPa, for a period of time falling between 1 minute and 24 hours, preferably between 5 minutes and 18 hours, more preferably between 10 minutes and 12 hours. The pre-activation may be effected in the presence of hydrogen, but for producing the ethylene polymer (A) having an intrinsic viscosity of from 15 to 100 dl/g, it is preferably effected in the absence of hydrogen.

The pre-activated catalyst obtained in the manner as above is, if desired, further combined with an additional organoaluminium compound (a') and an additional electron donor (e'), and used in producing the olefin multi-stage polymer (B). For the additional organoaluminium compound (a') and electron donor (e') optionally to be added to the catalyst, the same as those of the organoaluminium compound (a) and the electron donor (e) mentioned hereinabove can be used. One and the same type or two or more different types of these compounds may be used herein either singly or as combined. The additional organoaluminium compound (a') and electron donor (e') optionally to be added to the catalyst may be independently the same as those of the organoaluminium compound (a) and the electron donor (e) used for pre-activation.

The olefin multi-stage polymer (B) may be produced in any known olefin polymerization process. Concrete examples are a slurry polymerization method for olefin polymerization in an inert solvent of for example, aliphatic hydrocarbons (e.g., propane, butane, pentane, hexane, heptane, octane, isooctane, decane, dodecane), alicyclic hydrocarbons (e.g., cyclopentane, cyclohexane, methylcyclohexane), aromatic hydrocarbons (e.g., toluene, xylene, ethylbenzene), gasoline fractions and hydrogenated diesel oil fractions; a bulk polymerization method in which the olefin to be polymerized serves also as a solvent; a vapor-phase polymerization method of polymerizing an olefin in a vapor phase; a liquid-phase polymerization method of producing a liquid polyolefin; and a combined polymerization process of two or more of these methods.

In any of these polymerization processes, the olefin multi-stage polymer (B) is produced at a polymerization temperature falling between 20 and 120° C., preferably between 30 and 100° C., more preferably between 40 and 100° C., under a polymerization pressure falling between 0.1 and 5 MPa, preferably between 0.3 and 5 MPa, in a continuous, semi-continuous or batch system that takes a period of polymerization time falling between 5 minutes and 24 hours. Under the condition as above, the olefin multi-stage polymer (B) can be favorably produced at a controlled reaction speed and its production efficiency is high. Like in known olefin polymerization, hydrogen may be introduced into the polymerization system to control the molecular weight of the olefin multi-stage polymer (B) produced.

In the propylene polymer composition of the invention, MFR(i) of the polymer after the polymerization step (I) and MFR(ii) of the olefin polymer (II) preferably satisfy the following formulae (2) and (3):

$$3 \leq \mathrm{Log}(MFR(i)/MFR(ii)) \leq 7 \tag{2}$$

$$MFR(ii) < 1 \times 10^{-3} \text{ dg/min} \tag{3}$$

MFR(i) is obtained by actually measuring the polymer after the polymerization step (I). On the other hand, MFR(ii) is derived from a melt flow rate (MFR(b)) of the polymer after the polymerization step (II), which is obtained by actually measuring the polymer; and the content fraction ($W_1$) of the propylene polymer (I) in the olefin multi-stage polymer (B); and the content fraction ($W_2$) of the olefin polymer (II) therein, according to the following formulae (7) and (8):

$$\mathrm{Log}(MFR(b)) = W_1 \times \mathrm{Log}(MFR(i)) + W_2 \times \mathrm{Log}(MFR(ii)) \tag{7}$$

$$W_1 + W_2 = 1 \tag{8}$$

If the value of Log(MFR(i)/MFR(ii)) is smaller than 3, the melt tension of the propylene polymer composition will not increase. If Log(MFR(i)/MFR(ii)) is larger than 7, the thickness of the foam molding of the propylene polymer composition will not be uniform. Regarding the formula (2), it is more desirable that MFR(i) and MFR(ii) satisfy the following formula (9):

$$4 \leq \mathrm{Log}(MFR(i)/MFR(ii)) \leq 7 \tag{9}$$

If MFR(ii) of the olefin polymer (II) is larger than $1 \times 10^{-3}$ dg/min, the melt tension of the propylene polymer composition will not increase, and if so, the foam molding of the polymer composition is apt to draw down when thermoformed (fabricated). Regarding the formula (3), it is more desirable that MFR(ii) satisfies the following formula (10):

$$MFR(ii) < 5 \times 10^{-4} \text{ dg/min} \tag{10}$$

MFR(i) of the polymer after carrying out the polymerization step (I) preferably falls between 0.1 and 100 dg/min, more preferably between 0.1 and 50 dg/min.

The formulae (2) and (3) that define the propylene polymer composition of the invention preferably satisfy the following formulae (11) and (12), respectively:

$$4 \leq \mathrm{Log}(MFR(i)/MFR(ii)) \leq 7 \tag{11}$$

$$MFR(ii) < 5 \times 10^{-4} \text{ dg/min} \tag{12}$$

The propylene polymer (I), which is a component of the propylene polymer composition of the invention is preferably a propylene homopolymer, or a propylene-olefin copolymer of propylene and an olefin with from 2 to 12 carbon atoms except propylene, having at least 50% by weight, based on the copolymer, of propylene units. More preferably, it is a propylene homopolymer, or a propylene-olefin copolymer of propylene and an olefin with from 2 to 12 carbon atoms except propylene, having at least 70% by weight, based on the copolymer, of propylene units. The olefin with from 2 to 12 carbon atoms except propylene is preferably ethylene or 1-butene.

The olefin polymer (II), which is a component of the olefin multi-stage polymer (B) is a homopolymer or copolymer of an olefin with from 2 to 12 carbon atoms. The olefin for the olefin polymer (II) includes, for example, ethylene, propylene and 1-butene. More preferably, the olefin polymer (II) is an ethylene-olefin copolymer of ethylene and an olefin with from 3 to 12 carbon atoms; even more preferably an ethylene-olefin copolymer of ethylene and an olefin with from 3 to 12 carbon atoms, having from 30 to 80% by weight, still more preferably from 4 to 70% by weight, based on the copolymer, of ethylene units. One example of the preferred olefin polymer (II) is an ethylene-propylene copolymer containing from 30 to 80% by weight, based on the copolymer, of ethylene units. Most preferably, the olefin polymer (II) is an ethylene-propylene copolymer containing from 40 to 70% by weight, based on the copolymer, of ethylene units.

The olefin multi-stage polymer (B) for use in the invention contains from 30 to 95% by weight of the propylene polymer (I) and from 5 to 70% by weight of the olefin polymer (II). If the content of the propylene polymer (I) in the polymer (B) is smaller than 30% by weight, the thickness of the foam molding of the propylene polymer composition is likely to be uneven and the appearance thereof is likely to be worse. If the content of the propylene polymer (I) therein is larger than 95% by weight, the melt tension of the propylene polymer composition is unlikely to increase enough. Preferably, the olefin multi-stage polymer (B) for use in the invention contains from 40 to 95% by weight of the propylene polymer (I) and from 5 to 60% by weight of the olefin polymer (II).

MFR(i), MFR(II), MFR(b) and MFR(T) defined herein are all measured at 230° C. under a load of 2.16 kg, according to the condition 14 in Table 1 in JIS K7210.

The propylene polymer composition is especially favorable for foam molding. Its foam molding is good, as the fluctuation in the thickness thereof is well controlled to fall within a range of ±5% of the mean thickness of the foam molding.

In case where the polymer mixture for use in the invention is prepared in a method of producing the olefin multi-stage polymer (B) in the presence of a pre-activated olefin polymerization catalyst that supports the ethylene polymer (A) thereon, the method is optionally followed by known post treatment of, for example, catalyst inactivation, catalyst residue removal and drying, after the production of the olefin multi-stage polymer (B) therein.

For producing the foam moldings of the invention, employable is any known extrusion foaming method. For example, a foaming agent is added to the propylene polymer composition of the invention, and this is melt-kneaded and extruded out through a T-die or a circular die under reduced pressure. After having been thus directly extruded out through an extruder into sheet or cylindrical foams, they may be cut in the machine direction. The amount of the foaming agent to be added may fall between 0.1 and 10 parts by weight relative to 100 parts by weight of the propylene polymer composition of the invention.

The foaming agent may be any known volatile foaming agent or decomposable foaming agent. The volatile foaming agent includes, for example, aliphatic hydrocarbons such as propane, butane; alicyclic hydrocarbons such as cyclobutane; halogenohydrocarbons such as chlorodifluoromethane, trifluoromethane, dichlorodifluoromethane, dichlorotrifluoroethane, dichloropentafluoroethane; inorganic gases such as carbonic acid gas, carbon dioxide, air; and water. The decomposable foaming agent includes, for example, azo compounds such as azodicarbonamide; nitroso compounds such as N,N'-dinitropentamethylenetetramine; and p,p'-oxybisbenzenesulfonylhydrazide, and citric acid. If desired, a foaming promoter such as sodium hydrogencarbonate or citric acid may be added to the foaming polymer composition for controlling the decomposition temperature and the decomposition speed of the composition and for controlling the quantity of gas to be generated and the degree of foaming of the composition. One or more of such foaming agents may be used either singly or as combined.

The polymer mixture for use in the invention may contain, if desired, various additives such as antioxidant, UV absorbent, antistatic agent, nucleating agent, lubricant, flame retardant, antiblocking agent, colorant, and inorganic or organic filler, as well as any other different synthetic resins.

EXAMPLES

The invention is describe in more detail with reference to the following Examples and Comparative Examples, to which, however, the invention is not limited. The meanings of the terms used in the Examples and Comparative Examples, and the methods for measuring the samples therein are mentioned below.

(1) Intrinsic Viscosity [η]

Measured in tetralin at 135° C., using an Ostwald viscometer (by Mitsui Toatsu Chemical) (units in dl/g)

(2) MFR

Measured according to the condition 14 in Table 1 in JIS K7210 <temperature 230° C., load 2.16 kg> (units in dg/min)

(3) Ethylene Unit Content

Measured through IR absorption spectrometry (units in % by weight).

(4) Content Fractions ($W_1$, $W_2$) of Propylene Polymer (I) and Olefin Polymer (II) in Olefin Multi-stage Polymer (B)

In these examples, ethylene-propylene copolymers are previously prepared in varying ratios of ethylene to propylene. These are standard samples. Using Perkin-Elmer's FT-IR, the samples are subjected to IR absorption spectrometry to draw a calibration curve that indicates the IR absorption peak at 700 $cm^{-1}$ to 750 $cm^{-1}$. Based on the calibration curve, the reaction ratio of ethylene-propylene in the polymerization step (II) to produce the olefin polymer (II) is obtained, from which are derived the content fractions ($W_1$, $W_2$) on the basis of the ethylene unit content of the polymer after the polymerization step (II).

(5) Melt Tension (MS)

Melt Tension Tester Model 2 (by Toyo Seiki Seisakusho) is used to measure it (units in cN).

(6) Density of Foam Molding

Measured according to JIS K6767 (units in $g/cm^3$).

(7) Expansion Ratio

From the density of the propylene polymer composition and the density of its foam molding, the expansion ratio is obtained according to the following formula (units in times):
Expansion ratio=(density of propylene polymer composition)/(density of foam molding).

(8) Mean Cell Diameter of Foam Molding

A sample of the foam molding is cut in the direction perpendicular to the direction of its thickness, and the cross section of the thus-cut piece is photographed with a camera built-in microscope. The major axis and the minor axis of every cell seen in the cross-section area of from 0.25 to 1.0 $cm^2$ are measured, and the data are averaged. The average indicates the foam cell diameter. The data of all the foam cells measured are then averaged, and the average indicates the mean cell diameter of the sample (its unit is mm).

(9) Thickness of Foam Molding, and Its Fluctuation

Using a contact thickness meter (Sanbun Electric's TOF-4R), the thickness of the foam molding is measured, and its mean thickness (unit, mm) and fluctuation (unit, %) are calculated.

Example 1

(1) Preparation of Transition Metal Compound Catalyst Component

In a stainless reactor equipped with a stirrer, 37.5 liters of decane, 7.14 kg of anhydrous magnesium chloride and 35.1 liters of 2-ethyl-1-hexanol were mixed with stirring under heat at 140° C. for 4 hours to give a uniform solution. To the uniform solution, there was added 1.67 kg of phthalic anhydride, and the mixture was further stirred at 130° C. for 1 hour to dissolve it in the solution.

The resulting uniform solution was cooled to room temperature (23° C.), and this was dropwise added to 200 liters of titanium tetrachloride kept at −20° C. The complete addition took 3 hours. After the addition, this was heated up to 110° C. over a period of 4 hours, and when it reached 110° C., 5.03 liters of i-butyl phthalate was added to and reacted with this with stirring still at 110° C. for 2 hours. After that, the solid portion was collected by heat filtration. The solid portion was re-suspended with 275 liters of titanium tetrachloride, and maintained at 110° C. for 2 hours again for reaction.

After the reaction, the solid portion was collected again by heat filtration, which was then fully washed with n-hexane until no free titanium could be detected in the wash. Next, the solvent was removed through filtration, and the solid residue was dried under reduced pressure to obtain a titanium-containing, supported catalyst component (transition metal compound catalyst component) of which the titanium content was 2.4% by weight.

(2) Preparation of Pre-activated Catalyst

A 30-liter stainless reactor equipped with an inclined blade was purged with nitrogen gas, and 20 liters of n-hexane, 40 mmols of triethylaluminium, and 80 g (40 mmols in terms of titanium) of the titanium-containing, supported catalyst component prepared in the previous step were put into the reactor. At 15° C., 420 g of propylene was fed into it and prepolymerized for 120 minutes therein. After that, the non-reacted propylene was discharged out of the reactor, and the vapor phase in the reactor was purged once with nitrogen gas.

Separately, the polymer produced through prepolymerization under the same condition as above was analyzed, which confirmed that 2.1 g, per gram of the titanium-containing, supported catalyst component, of propylene polymer ($W_{O1}$) was formed, and the intrinsic viscosity [$\eta_1$] of the propylene polymer was 2.9 dl/g.

Next, while the temperature of the reactor was kept at 1° C., ethylene was continuously fed into the reactor for 6 hours to keep the pressure in there actor at 0.59 MPa. In that condition, the catalyst was pre-activated. After that, the non-reacted ethylene was discharged out of the reactor, and the vapor phase in the reactor was purged once with nitrogen gas to prepare a pre-activated catalyst slurry.

Separately, the prepolymerization and the pre-activation were effected under the same condition as above, and the amount ($W_{OT}$) of the polymer formed after the pre-activation was 55.3 g per gram of the titanium-containing, supported catalyst component. The intrinsic viscosity [$\eta_{OT}$] of the polymer was 30.8 dl/g.

The amount ($W_{O2}$) of the ethylene polymer (A) in 1 g of the titanium-containing, supported catalyst component that had been pre-activated with ethylene corresponds to the difference between the amount ($W_{OT}$) of the polymer in 1 g of the pre-activated, titanium-containing, supported catalyst component and the amount ($W_{O1}$) of propylene polymer in 1 g of the prepolymerized, titanium-containing, supported catalyst component, as in the following formula:

$$W_{O2} = W_{OT} - W_{O1}.$$

The intrinsic viscosity [$\eta_2$] of the ethylene polymer (A) formed through pre-activation with ethylene is derived from the intrinsic viscosity [$\eta_1$] of the propylene polymer formed through prepolymerization and the intrinsic viscosity [$\eta_{OT}$] of the polymer formed through prepolymerization and subsequent pre-activation, as in the following formula:

$$[\eta_2] = ([\eta_{OT}] \times W_{OT} - [\eta_1] \times W_{O1})/(W_{OT} - W_{O1}).$$

According to the formulae as above, the amount of the ethylene polymer (A) formed through pre-activation with ethylene was 53.2 g per gram of the titanium-containing, supported catalyst component; and the intrinsic viscosity [$\eta_2$] thereof was 31.9 dl/g.

(3) Polymerization Step (I)

A 500-liter stainless polymerization reactor equipped with a stirrer was purged with nitrogen, and 240 liters of n-hexane, 780 mmols of triethylaluminium, 78 mmols of diisopropyldimethoxysilane, and 1/10 of the pre-activated catalyst slurry that had been prepared in the above were put into the reactor. With that, 315 liters of hydrogen was introduced into the reactor, and propylene was fed thereinto continuously for 1.5 hours and polymerized at 70° C. to form a propylene polymer (I) (polymerization step (I)). The pressure in the vapor phase in the reactor was kept at 1.0 MPa. After the polymerization, the inner temperature of the reactor was lowered to 30° C., and hydrogen and the non-reacted propylene were discharged out. The polymer slurry in the reactor was sampled out and analyzed. Its melt flow rate (MFR(i)) was 11 dg/min; and the content of the ethylene polymer (A) that had been formed through the pre-activation in this was 0.82% by weight.

(4) Polymerization Step (II)

The inner temperature of the polymerization reactor was elevated up to 60° C., and 2 liters of hydrogen, 4.3 kg of ethylene and 12 kg of propylene were fed into the reactor continuously for 2 hours to form an olefin polymer (II) (polymerization step (II)). After the polymerization, the inner temperature of the reactor was lowered to 30° C., and hydrogen and the non-reacted ethylene and propylene were discharged out. Next, 50 liters, of methanol was introduced into the reactor to deactivate the catalyst at 60° C. for 30 minutes. Then, 0.7 liters of aqueous 20 wt. % sodium hydroxide solution was fed thereinto and stirred for 20 minutes, and thereafter 100 liters of pure water was fed there into and further stirred for 20 minutes. The aqueous layer was taken out, then 300 liters of pure water was again added to the reactor and stirred for 20 minutes, and the aqueous layer was taken out. With that, the hexane slurry was taken out, filtered, and dried.

The polymer after the polymerization step (II) (this is the "polymer mixture" in the invention), and the propylene-ethylene copolymer formed in the polymerization step (II) (this is the "olefin polymer (II)" in the invention) were analyzed, and their data are given in Table 1.

The amount of the "olefin multi-stage polymer (B)" in the invention is obtained by subtracting the amount of the propylene polymer formed through prepolymerization and that of the ethylene polymer (A) formed through pre-activation from the amount of the polymer after the polymerization step (II).

100 parts by weight of the thus-obtained polymer mixture was mixed with 0.1 parts by weight of 2,6-di-t-butyl-p-cresol and 0.1 parts by weight of calcium stearate, and the resulting mixture was melt-kneaded and granulated through an extrusion granulator having a screw diameter of 40 mm, at a temperature of the mixture being 300° C. to obtain a propylene polymer composition. The thus-obtained propylene polymer composition was analyzed, and its data are given in Table 1. Log(MS) of the polymer composition is 0.92, and (0.91−0.23×Log(MFR(T)) thereof is 0.76. The polymer composition satisfies the formula (1).

To 100 parts by weight of the composition obtained herein, there was added 0.1 parts by weight of a foam nucleating agent, which was sodium bicarbonate-citric acid, followed by mixing in a ribbon blender. The mixed composition was fed into a single-screw extruder having an aperture of 90 mm, and melted therein at 230° C. With 1 part by weight, relative to 100 parts by weight of the mixed composition to be extruded out, of a foaming agent (n-butane gas) being introduced under pressure into the barrel of the extruder and with the contents of the extruder being cooled to have the mixed composition temperature of 180° C. at the outlet of the extruder, the mixed composition in melt was extruded out of the extruder through a 120-mm$\phi$ cylindrical die, and the resulting cylindrical melt was passed through a 300-mm$\phi$ cylindrical chill mold to form a foam molding 1.51 mm thick. The thus-obtained foam molding was analyzed, and its data are given in Table 1.

Comparative Example 1

100 parts by weight of the polymer mixture prepared in the same manner as in Example 1 was mixed with 0.1 parts by weight of 2,6-di-t-butyl-p-cresol and 0.1 parts by weight of calcium stearate, and the resulting mixture was melt-kneaded and granulated through an extrusion granulator having a screw diameter of 40 mm, at a temperature of the mixture of 250° C. to give a propylene polymer composition. This was foam-molded into a foam molding also in the same manner as in Example 1. The propylene polymer composition and its foam molding were analyzed, and their data are given in Table 1.

Comparative Example 2

A propylene polymer composition was produced in the same manner as in Example 1, for which, however, the amount of hydrogen used in the polymerization step (II) was changed to 20 liters to prepare an olefin polymer (II) having MFR(ii) of $2\times10^{-2}$ dg/min. This was foam-molded into a foam molding also in the same manner as in Example 1. The propylene polymer composition and its foam molding were analyzed, and their data are given in Table 1. Log(MS) of the propylene polymer composition obtained herein is 0.69, and (0.91−0.23×Log(MFR(T)) thereof is 0.72. The polymer composition does not satisfy the formula (1).

TABLE 1

|  | Example 1 | Comp. Ex. 1 | Comp. Ex. 2 |
|---|---|---|---|
| Prepolymerization |  |  |  |
| Intrinsic viscosity of propylene polymer dl/g | 2.9 | 2.9 | 2.9 |
| Amount of propylene polymer formed (per gram of catalyst component) g/g | 2.1 | 2.1 | 2.1 |
| Composition ratio(*1) wt. pts. | 0.029 | 0.029 | 0.028 |
| Pre-activation |  |  |  |
| Instrinsic viscosity of ethylene polymer (A) dl/g | 31.9 | 31.9 | 31.9 |
| Amount of ethylene polymer (A) formed (per gram of catalyst component) g/g | 53.2 | 53.2 | 53.2 |
| Composition ratio(*1) wt. pts. | 0.75 | 0.75 | 0.71 |
| Polymerization step (I) |  |  |  |
| MFR (i) of polymer after polymerization step (I) dg/min | 11 | 11 | 12 |
| Composition ratio(*2) of propylene polymer (I) (100 $W_1$) wt. % | 92 | 92 | 91 |
| Polymerization step (II) |  |  |  |
| MFR (ii) of olefin polymer (II) dg/min | 0.0006 | 0.0006 | 0.02 |
| Composition ratio(*2) of olefin polymer (II) (100 $W_2$) wt. % | 8 | 8 | 9 |
| MFR (b) of polymer mixture(*3) dg/min | 5.0 | 5.0 | 6.8 |
| Log (MFR(i)/MFR(ii)) | 4.3 | 4.3 | 2.8 |
| Ethylene unit content of olefin polymer (II) wt. % | 61 | 61 | 59 |
| Ethylene unit content of polymer mixture(*3) wt. % | 4.9 | 4.9 | 5.2 |
| Yield of polymer misture(*3) kg | 57 | 57 | 60 |
| Granulation (melt-kneading) |  |  |  |
| Temperature of polymer mixture(*3) ° C. | 300 | 250 | 300 |
| Propylene polymer composition |  |  |  |
| MFR(T) dg/min | 4.7 | 2.7 | 6.7 |
| Melt tension cN | 8.4 | 18 | 4.9 |
| Foam molding |  |  |  |
| Density g/cm$^3$ | 0.26 | 0.26 | 0.41 |
| Expansion ratio times | 3.5 | 3.5 | 2.2 |
| Mean cell diameter mm | 0.2 | 0.2 | 0.5 |
| Mean thickness mm | 1.51 | 1.48 | 1.45 |
| Thickness fluctuation % | 3 | 15 | 3 |

(*1)relative to 100 parts by weight of olefin multi-stage polymer (B).
(*2)in olefin multi-stage polymer (B).
(*3)after polymerization step (II).

As is obvious from the data shown in Table 1, the melt tension of the propylene polymer composition of the invention is high; the foaming molding of the composition has a good appearance and the fluctuation in thickness thereof is small; and when thermoformed (fabricated), the foam molding is not broken, and has good quality.

What is claimed is:

1. A propylene polymer composition obtained by melt-kneading a polymer mixture comprising an olefin multi-stage polymer (B) below and an ethylene polymer (A) below in an amount from 0.01 to 5.0 parts by weight relative to 100 parts by weight of the polymer (B), and having a melt flow rate (MFR (T), unit: dg/min) of 0.1 to 100 dg/min and satisfying the following formula (1) for melt tension (MS, unit:cN) at 190° C. and the MFR (T):

$$1.2-0.23 \times \text{Log}(MFR(T)) > \text{Log}(MS) > 0.91 - 0.23 \, \text{Log}(MFR(T)) \quad (1),$$

[1] ethylene polymer (A), having an intrinsic viscosity of from 15 to 100 dl/g measured in tetralin at 135° C.,

[2] olefin multi-stage polymer (B), obtained by; producing a propylene polymer (I) in a polymerization step (I) to a range of from 30 to 95% by weight of the olefin multi-stage polymer, followed by producing an olefin polymer (II) in a subsequent polymerization step (II) to a range of from 5 to 70% by weight of the olefin multi-stage polymer.

2. The propylene polymer composition as claimed in claim 1, wherein the polymer mixture is melt-kneaded at a temperature thereof falling between 280 and 500° C.

3. The propylene polymer composition as claimed in claim 1, wherein the polymer mixture is prepared by producing the olefin multi-stage polymer (B) in the presence of a pre-activated catalyst prepared by supporting the ethylene polymer (A) on an olefin polymerization catalyst.

4. The propylene polymer composition as claimed in claim 3, wherein a melt flow rate (MFR(i), unit:dg/min) of the polymer after the polymerization step (I) and a melt flow rate (MFR(ii), unit:dg/min) of the olefin polymer (II) satisfy the following formulae (2) and (3):

$$3 \leq \text{Log}(MFR(i)/MFR(ii)) \leq 7 \quad (2)$$

$$MFR(ii) < 1 \times 10^{-3} \, \text{dg/min} \quad (3).$$

5. The propylene polymer composition as claimed in claim 1, wherein the propylene polymer (I) is a propylene homopolymer, or a propylene-olefin copolymer of propylene and an olefin with from 2 to 12 carbon atoms except propylene, having at least 50% by weight, based on the copolymer, of propylene units.

6. The propylene polymer composition as claimed in claim 1, wherein the olefin polymer (II) is a homopolymer or copolymer of an olefin with from 2 to 12 carbon atoms.

7. A foam molding of the propylene polymer composition of claim 1.

8. The foam molding as claimed in claim 7, of which the fluctuation in the thickness falls within a range of ±5% of the mean thickness of the foam molding.

9. A foam molding of the propylene polymer composition of claim 2.

10. The foam molding as claimed in claim 9, of which the fluctuation in the thickness falls within a range of ±5% of the mean thickness of the foam molding.

11. A foam molding of the propylene polymer composition of claim 3.

12. The foam molding as claimed in claim 11, of which the fluctuation in the thickness falls within a range of ±5% of the mean thickness of the foam molding.

13. The foam molding of the propylene polymer composition of claim 4.

14. The foam molding as claimed in claim 13, of which the fluctuation in the thickness falls within a range of ±5% of the mean thickness of the foam molding.

15. The foam molding of the propylene polymer composition of claim 5.

16. The foam molding as claimed in claim 15, of which the fluctuation in the thickness falls within a range of ±5% of the mean thickness of the foam molding.

17. The foam molding of the propylene polymer composition of claim 6.

18. The foam molding as claimed in claim 17, of which the fluctuation in the thickness falls within a range of ±5% of the mean thickness of the foam molding.

* * * * *